(12) United States Patent (10) Patent No.: US 6,863,996 B2
Yano (45) Date of Patent: Mar. 8, 2005

(54) FLUORESCENT THIN FILM, ITS FABRICATION PROCESS, AND EL PANEL

(75) Inventor: Yoshihiko Yano, Tokyo (JP)

(73) Assignee: The Westaim Corporation, Fort Saskatchewan (CA)

( * ) Notice: Subject to any disclaimer, the term of this patent is extended or adjusted under 35 U.S.C. 154(b) by 295 days.

(21) Appl. No.: 09/834,950

(22) Filed: Apr. 16, 2001

(65) Prior Publication Data

US 2002/0001733 A1 Jan. 3, 2002

(30) Foreign Application Priority Data

Apr. 17, 2000 (JP) ........................................ 2000-115666

(51) Int. Cl.[7] .......................... B05D 5/00; C09K 11/08; H05B 33/12
(52) U.S. Cl. ................. 428/690; 428/917; 252/301.4 R; 252/301.4 S; 313/502; 313/503; 427/66; 427/157
(58) Field of Search ................................ 428/690, 917, 428/403; 313/503, 504, 483; 252/301.45, 301.4 R

(56) References Cited

U.S. PATENT DOCUMENTS

| | | | | |
|---|---|---|---|---|
| 5,314,759 A | * | 5/1994 | Harkonen et al. | ........... 428/690 |
| 5,662,831 A | * | 9/1997 | Chadha | ............... 252/301.4 R |
| 6,153,123 A | * | 11/2000 | Hampden-Smith et al. | ...................... 252/304.45 |
| 6,180,029 B1 | * | 1/2001 | Hampden-Smith et al. | ...... 252/301.4 |

FOREIGN PATENT DOCUMENTS

| | | | |
|---|---|---|---|
| JP | 56-057877 | | 5/1981 |
| JP | 56-82878 | | 7/1981 |
| JP | 7-122364 | | 5/1995 |
| JP | 07-122364 | * | 5/1995 |
| JP | 08-008188 | | 1/1996 |
| JP | 8-134440 | | 5/1996 |
| JP | 08-134440 | * | 5/1996 |

OTHER PUBLICATIONS

English Abstract for JP 56–057877, May 20, 1981.
G. K. Aslanov, et al., Database CA 'Online', Chemical Abstract of Journal of Luminescence, vol. 33, No. 2, 1 page, XP–002230999, "Neodymium Luminescence in Chalcogenides of Europium–Gallium: EuGaS4 and EuGa2Se4", 1985.
M. Kawanishi, et al., The Institute of Electronics, Information and Communication Engineers, EID98–113, pp. 19–24, "$CaAl_2S_4$: Ce Thin Film EL Devices Prepared by the Two Targets Pulse Electron–Beam Evaporation", 1999.
N. Miura, et al., Japanese Journal of Applied Physics, vol. 38, Part 2, No. 11B, pp. L1291–L1292, "High–Luminance Blue–Emitting $BaAl_2S_4$: Eu Thin–Film Electroluminescent Devices", Nov. 15, 1999.
S. Oshio, et al., Display and Imaging, vol. 3, No. 2, pp. 181–187, "Novel Electroluminescent Thin Films: Thiogallate–Type Phosphors", 1994 (with partial English translation and Concise Explanation).

(List continued on next page.)

Primary Examiner—Rena Dye
Assistant Examiner—Camie Thompson
(74) Attorney, Agent, or Firm—Oblon, Spivak, McClelland, Maier & Neustadt, P.C.

(57) ABSTRACT

A fluorescent thin film is provided, including a matrix material containing as a main component a rare earth sulfide or a rare earth selenide and a rare earth element additive as a light emission center. The rare earth element additive is different from the rare earth element used for the matrix material.

11 Claims, 2 Drawing Sheets

OTHER PUBLICATIONS

P. C. Donohue, et al., J. Electrochem. Soc.: Solid–State Science and Technology, vol. 121, No. 1, pp. 137–141, "The Synthesis and Photoluminescent of $M^{II}M_2^{III}(S,Se)_4$", Jan. 1974.

T. E. Peters, J. Electrochem. Soc.: Solid–State Science and Technology, vol. 119, No. 12, pp. 1720–1723, "Luminescent Properties of Thiogallate Phosphors", Dec. 1972.

T. E. Peters, et al., J. Electrochem. Soc.: Solid–State Science and Technology, vol. 119, No. 2, pp. 230–236, "Lumines cence and Structural Properties of Thiogallate Phosphors $Ce^{+3}$ and $Eu^{+2}$–Activated Phosphors. Part I", Feb. 1972.

I. Tanaka, et al., The $22^{th}$ Seminar Data, Photoelectric Inter–Conversion the $125^{th}$ Commission EI Department, pp. 16–21, "Composition and Optical Properties of Blue–Emitting $BaAl_2S_4:Eu^{2+}$ Electroluminescent Thin Films", May 26, 2000 (with partial English translation and Concise Explanation).

* cited by examiner

FLUORESCENT THIN FILM, ITS FABRICATION PROCESS, AND EL PANEL

BACKGROUND OF THE INVENTION

The present invention relates generally to a sulfide light-emitting layer used for inorganic EL devices, and more particularly to a fluorescent thin film used for a light-emitting layer and an EL panel using the same.

In recent years, thin-film EL devices used for small- or large-format yet lightweight flat displays have been under extensive studies. A monochromatic thin-film EL display using a fluorescent thin film comprising manganese-added zinc sulfide for emitting yellowish orange light has already been put to practical use in the form of a double-insulation type structure using such thin-film insulating layers 2 and 4 as shown in FIG. 2. Referring here to FIG. 2, a lower electrode 5 is formed on a substrate 1 in a predetermined pattern, and a first insulating layer 2 is formed on the lower electrode 5. The first insulating layer 2 is provided thereon with a light-emitting layer 3 and a second insulating layer 4 in this order, and the second insulating layer 4 is provided thereon with a predetermined pattern of an upper electrode 6 in such a way as to from a matrix circuit with the lower electrode 5.

To accommodate well to personal computer displays, TV displays and other displays, color displays are absolutely needed. Thin-film EL displays using a sulfide fluorescent material thin film are excellent in reliability and resistance to environmental conditions. At present, however, they are thought of as being unsuitable for color display purposes, because the properties of an EL fluorescent material for emitting the three primary colors or red, green and blue are less than satisfactory. Candidates for a blue emitting fluorescent material are SrS:Ce where SrS is used as a matrix material and Ce as a light emission center and ZnS:Tm, candidates for a red emitting fluorescent material are ZnS:Sm and CaS:Eu, and candidates for a green emitting fluorescent material are ZnS:Tb, CaS:Ce, etc. These materials are now under continued investigations.

These fluorescent materials for emitting the three primary colors, viz., red, green and blue have problems in conjunction with light emission luminance, efficiency, color purity, etc., and so color EL panels are still on impractical levels. For blue in particular, relatively high luminance is obtained using SrS:Ce. However, such luminance is still unsatisfactory for blue applied to full-color displays, with chromaticity shifted to a green side. Thus, much improved blue emitting layers are in great demand.

To provide a solution to these problems, thiogallate or thioaluminate blue fluorescent materials such as $SrGa_2S_4$:Ce, $CaGa_2S_4$:Ce, and $BaAl_2S_4$:Eu have been developed, as set forth in JP-A's 07-122364 and 08-134440, Shingaku Giho EID98-113, pp. 19–24, and Jpn. J. Appl. Phys. Vol. 38, (1999), pp. L1291–1292. These thiogallate fluorescent materials offer no problem in connection with color purity, but have a low luminance problem. In particular, it is very difficult to obtain uniform thin films because such materials have a multiple composition. Poor crystallizability due to poor composition controllability, defects due to sulfur release, contamination with impurities, etc. appear to be leading factors for a failure in obtaining thin films of high quality, and so resulting in no luminance increase. Thioaluminate in particular has great difficulty in composition controllability.

Thioaluminate thin films are now fabricated by a process wherein a target having the same composition as that of the $BaAl_2S_4$:Eu thin film to be obtained is prepared and this target is then used to obtain a light-emitting layer by sputtering, as shown in JP-A 08-134440, and a process wherein two pellets of BaS:Eu and $Al_2S_3$ are prepared to obtain $BaAl_2S_4$:Eu by a two-source pulse electron beam evaporation technique, as described in Jpn. J. Appl. Phys. Vol. 38, (1999), pp. L1291–1292.

JP-A 07-122364 discloses a process of obtaining an $SrIn_2S_4$:Eu light-emitting layer, wherein Sr metal, In metal and $EuCl_3$ in the form of evaporation sources are evaporated by an MBE technique in a vacuum chamber with $H_2S$ gas introduced therein to form an $SrIn_2S_4$:Eu light-emitting layer on a substrate. With this process, however, it is very difficult to control the respective sources for the metals of a matrix material ($SrIn_2S_4$) and a light emission center material (Eu), thereby gaining precise control of the amount of the light emission center. With state-of-the-art evaporation processes, for instance, it is close to impossible to control the molar ratio of Sr and In to 1:1 for a sulfurization reaction by $H_2S$, and regulate the molar ratio of Eu and the matrix material to 99.5:0.1 while the variation in the Ce amount of 0.1 is kept within 5% or less. Referring here to an Al electrode used as an LSI electrode, the variation of thickness of the Al thin film in an evaporation process is about 5%, although its evaporation source is kept relatively stable. From this, too, it is found that much difficulty is experienced in control of the concentration of Eu to a precision of 5% or less.

For EL thin films for other colors, i.e., red and green, on the other hand, red emitting fluorescent materials ZnS:Sm and CaS:Eu, and green emitting fluorescent materials ZnS:Tb and CaS:Ce are provided in the form of targets or pellets having the respective compositions, which are then processed by sputtering or EB evaporation to obtain fluorescent thin films capable of emitting light at relatively high luminance.

To achieve full-color EL panels, fluorescent materials capable of emitting blue, green and red light in a stable fashion and at low costs and their fabrication process are needed. However, fluorescent thin films must be fabricated by separate processes depending on their type, because the chemical or physical properties of matrix materials for the fluorescent thin films and light emission center materials differ from material to material as mentioned above. For instance, with a film formation process capable of obtaining high luminance with one single material, it is impossible to increase the luminance of a fluorescent thin film of other color. Given a full-color EL panel fabrication process, a plurality of different film formation systems are thus needed. As a result, the fabrication process increases in complexity, with an increasing panel fabrication cost.

The EL spectra of the aforesaid blue, green and red EL fluorescent thin films are all broad. When they are used for a full-color EL panel, the RGB necessary for the panel must be cut out of the EL spectra of the EL fluorescent thin films using separate filters. The use of such filters does not only make the fabrication process much more complicated, but also offer the gravest problem, viz., luminance drops. Extraction of RGB using filters causes practically unacceptable losses of 10 to 50% of the luminance of the blue, green and red EL fluorescent thin films.

To provide a solution to the aforesaid problems, there is an increasing demand for red, green and blue fluorescent thin-film materials capable of emitting light at enhanced luminance yet with improved color purity as well as a fluorescent matrix material and a light emission center material which can ensure enhanced luminance using the same film formation method or system and are similar to each other in terms of chemical or physical properties.

SUMMARY OF THE INVENTION

One object of the present invention is to provide a fluorescent thin film which can dispense with any filter and has satisfactory color purity, and is particularly well fit for RGB full-color ELs and its fabrication process as well as an EL panel.

Another object of the present invention is to simplify a full-color EL panel production process, thereby providing a fluorescent thin film which is less susceptible to luminance variations and can be produced in improved yields and so at lower costs and its fabrication process as well as an EL panel.

Such objects are attainable by the embodiments of the invention defined below as (1) to (7).

(1) A fluorescent thin film comprising a matrix material containing as a main component a rare earth sulfide or a rare earth selenide and a rare earth element added thereto as a light emission center, said rare earth element being different from a rare earth element used for said matrix material.

(2) The fluorescent thin film according to (1) above, wherein said matrix material contains as the main component at least one compound selected from the group consisting of a rare earth thioaluminate, a rare earth thiogallate and a rare earth thioindate.

(3) The fluorescent thin film according to (1) or (2) above, wherein said rare earth element used for said matrix material is an element selected from the group consisting of Y, La, Ce, Pr, Nd, Gd, Tb, Ho, and Er.

(4) The fluorescent thin film according to any one of (1) to (3) above, wherein said matrix material is lanthanum thioaluminate, and neodymium thioaluminate.

(5) The fluorescent thin film according to any one of (1) to (4) above, wherein said rare earth element added as said light emission center is one element selected from the group consisting of at least Ce, Eu, Tb and Tm.

(6) An EL panel comprising a fluorescent thin film as recited in any one of (1) to (5) above.

(7) A process of forming the fluorescent thin film according to (1) above by an evaporation technique, wherein:

at least, a rare earth metal evaporation source and a group III sulfide evaporation source with a light emission center added thereto are placed in a vacuum chamber with $H_2S$ gas introduced therein, and a rare earth metal and a group III sulfide material are evaporated from the respective evaporation sources to deposit a sulfide fluorescent thin film on a substrate while the respective materials are combined with the $H_2S$ gas.

EMBODIMENTS OF THE INVENTION

Figure 1:
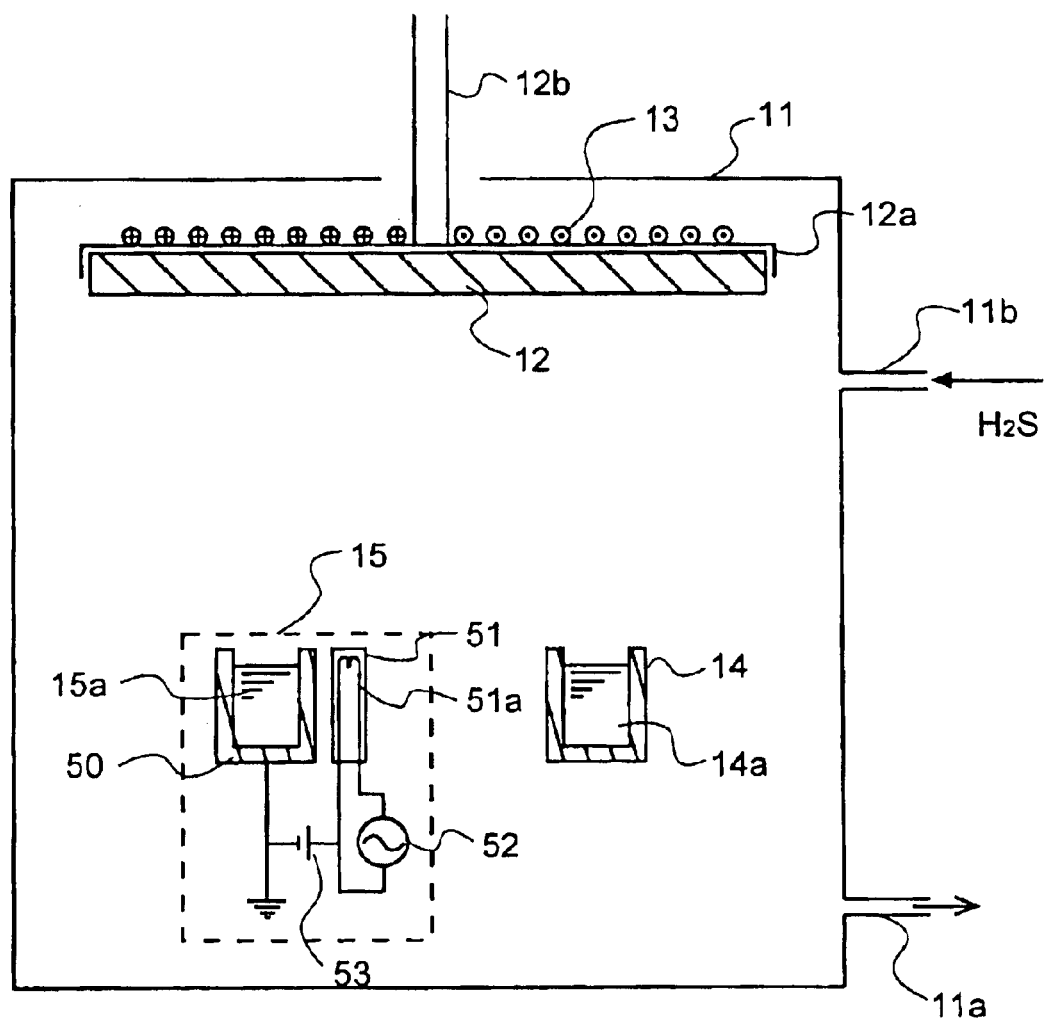
FIG. 1 is a schematic representation in section illustrative of a system to which the invention is applicable or one exemplary arrangement of the fabrication system of the invention.

Specific embodiments of the invention are now explained at great length.

The present invention has been accomplished as a result of the synthesis of compound materials comprising rare earth elements having chemically or physically similar properties, using a reactive evaporation process as the same film formation method. The obtained fluorescent thin film can radiate light emissions of diverse colors in wide red-to-blue ranges.

The fluorescent thin film of the present invention comprises a matrix material containing as a main component a rare earth sulfide or a rare earth selenide, and a rare earth element added thereto as a light emission center. This rare earth element contains as a main component at least one compound selected from the group consisting of a rare earth thioaluminate, a rare earth thiogallate and a rare earth thioindate, and is different from the rare earth element used for the matrix material.

Rare earth elements exist in the stable form of sulfides and selenides, and are more stable and more resistant to humidity and oxidation than compounds such as BaS and SrS which occur at intermediate steps of the process of preparing conventional thioaluminates, thiogallates and thioindates of alkaline earth elements such as Ba, Sr and Ca. For this reason, the rare earth elements are less susceptible to contamination at a fluorescent thin film preparation step, and can yield a fluorescent thin film of higher quality than ever before.

The matrix material contains as its main component a rare earth sulfide or a rare earth selenide. Preferably in this case, the matrix material should contain as its main component a rare earth sulfide, and especially at least one compound selected from the group consisting of a rare earth thioaluminate, a rare earth thiogallate and a rare earth thioinlate.

The rare earth thioaluniinate, the rare earth thiogallate, the rare earth thioindate, and the rare earth thioselenate should preferably be represented by the following composition formula:

Here R and Re are each a rare earth element with the proviso that R≠Re, M is at least one element selected from the group consisting of Al, Ga and In, and x and y are each an integer and may be identical with or different from each other.

Referring now to this composition formula, R and Re are each a different element. The matrix material using R as a constituting element forms a crystal field, wherein the added R functions as a light emission center. To obtain EL light emission, the element R must be different from the element Re. Of rare earth elements, Sm, Eu, Dy and Yb have high sublimability in their metallic state, and so are materials that are less susceptible to composition control during thin film synthesis. For the element R, therefore, it is preferable to use Sc, Y, La, Ce, Pr, Nd, Gd, Tb, Ho, Er, Tm, and Lu. In consideration of the scarcity of rare earth elements, viz., material cost, it is particularly preferable to use Y, La, Ce, Pr, Nd, Gd, Tb, Ho, and Er, among which La and Nd are most preferred because of ability to provide compounds of high crystallizability.

Preferable, but not exclusive, selenides are a rare earth selenaluminate or $R_xAl_ySe_z$ where R is any one of Sc, Y, La, Ce, Pr, Nd, Gd, Th, Ho, Er, Tm and Lu, and x, y and z are each an integer and may be identical with or different from one another, a rare earth selenagallate or $R_xGa_ySe_z$ where R is any one of Sc, Y, La, Ce, Pr, Nd, Gd, Tb, Ho, Er, Tm and Lu, and x, y and z are each an integer and may be identical with or different from one another, and a rare earth selenaindate or $R_xIn_ySe_z$ where R is any one of Sc, Y, La, Ce, Pr, Nd, Gd, Tb, Ho, Er, Tm and Lu, and x, y and z are each an integer and may be identical with or different from one another.

The rare earth element Re added as the light emission center is selected from at least the group consisting of Sc, Y, La, Ce, Pr, Nd, Gd, Tb, Ho, Er, Tm, Lu, Sm, Eu, Dy and Yb, among which Ce, Eu, Tb and Tm are preferred. These elements have an effective transition within the $(RS)_x(M_2S_3)_y$ compound crystal field to ensure high-luminance light emission.

For instance, such a fluorescent thin film should preferably be obtained by the following multiple reactive evaporation process.

By evaporation, the rare earth metal and aluminum sulfide are allowed to react with each other on a substrate to obtain a thioaluminate thin film. While the invention is herein explained mainly with reference to the rare earth thioaluminate, it is understood that group III sulfides such as gallium sulfide and indium sulfide may be used to obtain thiogallate and thioindate. For accelerated sulfurization, it is preferable to use hydrogen sulfide (H.sub.2S) as a sulfur supply source.

Aluminum sulfide may have an about 10% deviation from its stoichiometric composition. However, it is preferred that aluminum sulfide is as close to its stoichiometric composition as possible in order to increase the precision of the amount of the light emission center added when the evaporation source is prepared by adding the light emission center to the sulfide.

The light emission center is added to aluminum sulfide. A few mol % or less of the light emission center may be uniformly added to aluminum sulfide. The resultant material is then processed into a pellet, powder, power compact and lump which are to be evaporated. Upon evaporation, the light emission center substance together with aluminum sulfide reaches the substrate, so that the slight amount of light emission center can be added into the thioaluminate light-emitting layer with improved controllability. In other words, aluminum sulfide acts as a carrier for the impurity substance (light emission center), so that 1 mol % or less of the light emission center can be uniformly added into the thioaluminate with precision.

The aforesaid rare earth element is added to the light emission center. The rare earth element in the form of a metal, fluoride or sulfide is added to the raw material. The amount of the rare earth element added varies depending on the raw material and the thin film to be formed; the composition of the raw material is regulated in such a way that the amount of the rare earth element added is properly determined.

In the fluorescent thin film of the present invention, it is preferable that as the light emission center Eu is added to the thioaluminate material, and especially the rare earth thioaluminate material. In other words, the fluorescent thin film should preferably be formed in a $H_2S$ gas atmosphere using an La metal and EuS-added $Al_2S_3$ as sources.

For evaporation processes and evaporation sources, use may be made of known processes and evaporation sources such as EB (electron beam), resistance heating, lasers, Knudsen cells (K-cells), etc. In the present invention, the K-cell is used as a sort of resistance heating evaporation source. In particular, Sm, Eu, Dy, and Yb should preferably be used with resistance heating and K-cells. For other rare earth sulfides and aluminum sulfide, EB evaporation is preferred. The rate of evaporation of each material should be of the order of 5 to 50 nm/sec., although varying with the composition of the film to be formed.

During evaporation, the substrate should be maintained at a temperature of 100° C. to 1,000° C., preferably 350° C. to 800° C., and more preferably 450° C. to 700° C. At too high a substrate temperature, the surface asperity of the matrix material thin film becomes rough, causing pinholes in the thin film and, hence, causing an EL device to have a leakage current problem. For this reason, the aforesaid temperature range is preferred. Postfilm formation annealing is also preferred. Annealing should then be carried out at preferably 600° C. to 1,000° C., and more preferably 800° C. to 900° C.

According to the present invention, composition control of thioaluminate cannot only be gained but the crystallizability of thioaluminate can be improved as well. For instance, the ratio of La, Al and S in the thioaluminate or $LaAl_2S_4$ thin film can be easily controlled to 1:2:1. This makes it possible to obtain a thioaluminate thin film of high crystallizability and, at the same time, allows S, Al, La, $Al_2S_3$, LaS and their clusters to diffuse on the surface of the substrate and the respective elements to be positioned at stable crystal sites, so that a thin film of high crystallizability can be obtained. Especially for an EL device used for light emission in a high electric field, it is required to enhance the crystallizability of the matrix material, thereby obtaining a fluorescent thin film having high luminance. According to the present invention, an easily crystallizable thin film can be obtained. If required, S or other gas may be introduced in the system.

The thus formed sulfide thin film should preferably be of high crystallizability. For instance, crystallizability may be evaluated by X-ray diffraction. For enhancement of crystallizability, the temperature of the substrate should be as high as possible. Post-thin film formation annealing in a vacuum, $N_2$, Ar, S vapor, $H_2S$ or the like, too, is effective to this end.

No particular limitation is imposed on the thickness of the light-emitting layer. Too large a thickness ends up with a driving voltage increase and too small a thickness leads to a light emission efficiency drop. To be more specific, the light-emitting layer should have a thickness of preferably 100 to 2,000 nm, and especially about 150 to 700 nm although varying with the fluorescent material used.

The pressure for evaporation should preferably be $1.33 \times 10^{-4}$ to $1.33 \times 10^{-1}$ Pa ($1 \times 10^{-6}$ to $1 \times 10^{-3}$ Torr). Especially for accelerated sulfurization, the pressure should be regulated to $6.65 \times 10^{-3}$ to $6.65 \times 10^{-2}$ Pa ($5 \times 10^{-5}$ to $5 \times 10^{-4}$ Torr) by control of the amount of $H_2S$ gas introduced. At too high an evaporation pressure, the operation of an electron gun becomes unstable and so composition control becomes very difficult. The amount of hydrogen sulfide introduced should be 5 to 200 SCCM, and preferably 10 to 30 SCCM although depending on the capacity of the vacuum system used.

If required, it is acceptable to move or rotate the substrate during evaporation. If the substrate is moved or rotated, it is then possible to obtain a film having a uniform composition and a consistent thickness distribution.

The substrate, if rotated, should be revolved at preferably 10 rpm or greater, more preferably 10 to 50 rpm, and even more preferably about 10 to 30 rpm. At too high rpm, a problem tends to arise in connection with sealability, etc., when the substrate is loaded in a vacuum chamber. At too low rpm, a composition variation is found in the thickness direction in the chamber. As a result, the properties of the formed light-emitting layer become worse. Means for rotating the substrate may be built up of known rotation mechanisms comprising a power source such as a motor or hydraulic rotation mechanism and a power transmission/reduction mechanism using combinations of gears, belts, pulleys, etc.

A crucible or boat for resistance heating or the K-cell evaporation source should preferably be formed of a material that is less susceptible to chemical reactions with the material to be evaporated and can stand up to a given temperature. Preferable for this material are ceramics such as pyrolytic boron nitride (PBN), alumina and magnesia, quartz, etc., among which PBM is particularly preferred.

Heating means for heating the evaporation source or substrate may have a given heat capacity, given reactivity, etc. For instance, tantalum wire heaters, and carbon heaters may be used. The evaporation source or substrate should preferably be heated by the heating means to about 100 to 1,400° C. with a temperature control precision of ±1° C., and preferably about ±0.5° C. at 1,000° C.

One exemplary arrangement of the system for forming the light-emitting layer of the present invention is shown in FIG. 1. Here, $SmAl_2S_4$:Eu is used as an example. As shown, the system comprises a vacuum chamber 11 in which a substrate 12 on which the light-emitting layer is to be formed, a K-cell 14 providing an Sm evaporation source and an EB evaporation source 15 providing an aluminum sulfide evaporation source are located. The vacuum chamber 11 has an evacuation port 11a via which the vacuum chamber 11 is evacuated to a given degree of vacuum. The vacuum chamber 11 has also a feed gas inlet port 11b via which hydrogen sulfide gas ($H_2S$) is introduced thereinto.

The substrate 12 is fixed to a substrate holder 12a having a shaft 12b that is rotatably mounted by rotating shaft fixing means (not shown) while the degree of vacuum is maintained in the vacuum chamber 11. The shaft is rotatably driven by driving means (not shown) at a given rpm, if required. Heating means 13 made up of a heater wire, etc. is fixed to the substrate holder 12a in close contact relation thereto to heat the substrate to the desired temperature and hold the substrate at that temperature.

The Sm metal material 14a to be evaporated is received in the K-cell 14 that provides an Sm evaporation source. This K-cell 14 is heated by heating means (not shown), so that the metal material can be evaporated at the desired rate of evaporation. The EB (electron beam) evaporation source 15 that provides the aluminum sulfide evaporation means includes a crucible 50 for receiving aluminum sulfide 15a with a light emission center added thereto and an electron gun 51 with a built-in filament 51a for the emission of electrons. The electron gun 51 is connected with an alternating-current power supply 52 and a bias power supply 53.

In this system, a vapor of the Sm material evaporated from the K-cell 14, a vapor of aluminum sulfide evaporated from the EB evaporation source 15 and the hydrogen sulfide gas introduced into the vacuum chamber 11 are deposited and combined with one another on the substrate 12 to form a light-emitting layer. If, in this case, the substrate 12 is rotated at need, it is then possible to make uniform the composition and thickness distribution of the light-emitting layer to be deposited. It is here noted that to say nothing of Sm and aluminum sulfide, the materials necessary to form the desired thin film may be charged in the K-cell 14 and the aforesaid evaporation source 15.

With the fluorescent thin film material and fabrication process by evaporation according to the present invention, it is thus possible to easily form a fluorescent thin film capable of emitting light at high luminance.

Figure 2:
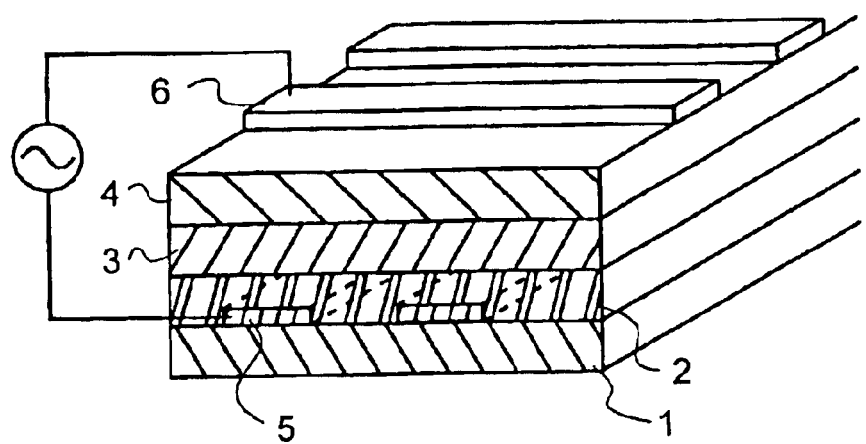
FIG. 2 is a schematic representation in section illustrative of one exemplary construction of the inorganic EL device which can be fabricated according to the process of the invention using the fabrication system of the invention.

To obtain an inorganic EL device using the light-emitting layer 3 of the present invention, for instance, it is preferable to make use of such structure as shown in FIG. 2. Between adjacent members of substrate 1, electrodes 5 and 6, thick-film insulating layer 2 and thin-film insulating layer 4 there may be interleaved an intermediate layer such as a contact-enhancing layer, a stress-relieving layer, and a reaction-preventing layer. The thick film may be polished on its surface or improved in terms of flatness as by using a flattening layer.

FIG. 2 is a partly sectioned perspective view illustrative of the structure of an inorganic EL device using the light-emitting layer of the present invention. As shown in FIG. 2, a lower electrode 5 in a given pattern is formed on a substrate 1. This lower electrode 5 is provided thereon with a thick film form of first insulating layer (thick-film dielectric layer) 2. The first insulating layer 2 is provided thereon with a light-emitting layer 3 and a second insulating layer (a thin-film form of dielectric layer) 4 in this order. The second insulating layer 4 is provided thereon with a given pattern of upper electrode 6 in such a way as to construct a matrix circuit with the lower electrode 5.

The substrate used should be formed of a material which has a heat-resistant temperature enough to be capable of standing up to a thick film formation temperature, an EL fluorescent layer formation temperature and an annealing temperature for an EL device or having a melting point of 600° C. or higher, preferably 700° C. or higher, and more preferably 800° C. or higher, and can be provided thereon with a non-structural film such as a light-emitting layer to form an EL device and maintain given strength. To this end any desired material may be used provided that it meets these requirements. For instance, ceramic substrates such as alumina ($Al_2O_3$), forsterite ($2MgO \cdot SiO_2$), steatite ($MgO \cdot SiO_2$), mullite ($3Al_2O_3 \cdot 2SiO_2$), beryllia (BeO), aluminum nitride (AlN), silicon nitride (SiN) and silicon carbide (SiC+BeO) substrates and heat-resistant glass substrates such as crystallized glass substrates are usable. These substrates have all a heat-resistant temperature of about 1,000° C. or higher. Of these, alumina substrates and crystallized glass substrates are preferred. Where thermal conductivity is needed, beryllia substrates, aluminum nitride substrates and silicon carbide substrates are preferred.

Besides, quartz wafers, thermally oxidized silicon wafers and metal substrates such as titanium, stainless, inconel and iron substrates may be used. Where electrically conductive substrates such as metal substrates are used, it is preferable to make use of structure where a thick film having an electrode therein is formed on the substrate.

For the dielectric thick-film material (the first insulating layer), known dielectric thick-film materials may be used. Preferably in this case, materials having relatively high dielectric constants should be used.

For instance, materials based on lead titanate, lead niobate and barium titanate may be used.

The dielectric thick film has a resistivity of $10^8$ Ω·cm or greater, and especially of the order $10^{10}$ to $10^{18}$ Ω·cm. The dielectric thick film should preferably be formed of a material having a relatively high dielectric constant $\epsilon$ of about 100 to 10,000, and a thickness of 5 to 50 μm, especially 10 to 30 μm.

Preferably but not exclusively, the insulating thick film is formed by processes that enable a film of 10 to 50 μm in thickness to be easily obtained, for instance, a sol-gel process or a printing firing process.

When the printing firing process is used, a material having a consistent particle size is mixed with a binder to prepare a paste having a suitable viscosity. This paste is then formed on the substrate by a screen printing process, followed by drying. The obtained green sheet is fired at a suitable temperature to obtain a thick film.

The thin-film insulating layer (second insulating layer), for instance, may be formed of silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate and PMN-PT material which may be used in a multilayer or mixed layer form. These materials may be used to form an insulating layer by existing processes such as evaporation, sputtering, CVD, sol-gel, and printing firing processes. In this case, the insulating layer has a thickness of preferably 50 to 1,000 nm, and especially of the order of 100 to 500 nm.

The electrode (lower electrode) is located, at least, on the substrate side or in the first dielectric material. The electrode layer that is exposed along with the light-emitting layer to high temperatures for thermal treatments during thick-film formation is formed of an ordinarily used metal electrode composed mainly of two or more metals selected from palladium, rhodium, iridium, rhenium, ruthenium, platinum, tantalum, nickel, chromium, titanium, etc.

Other electrode layer defining the upper electrode should be transparent to light in a given light emission wavelength range, because emitted light is usually extracted from the side opposite to the substrate. If the substrate is transparent, then the transparent electrode can also be used for the lower electrode because the emitted light can be extracted from the substrate side. In this case, it is particularly preferable to use a transparent electrode such as a ZnO or ITO electrode. Usually, ITO contains $In_2O_3$ and SnO in the form of stoichiometric composition; however, the amount of O may deviate slightly from this. The mixing ratio of $SnO_2$ with respect to $In_2O_3$ should preferably be 1 to 20% by mass, and especially 5 to 12% by mass. In IZO, usually, the mixing ratio of ZnO with respect to $In_2O_3$ is of the order of 12 to 32% by mass.

The electrode may contain silicon. This silicon electrode layer may be either a polycrystal silicon (p-Si) electrode or an amorphous silicon (a-Si) electrode. If required, a monocrystal silicon electrode may be used.

The electrode is mainly composed of silicon, and is doped with impurities to ensure electric conductivity. Requirements for the dopants used as impurities are to ensure given electric conductivity; ordinary dopants used so far with silicon conductors such as B, P, As, Sb and Al may be used. However, B, P, As, Sb and Al are particularly preferred. The concentration of the dopants is preferably of the order of 0.001 to 5 at %.

These materials are used to form an electrode layer by existing processes such as evaporation, sputtering, CVD, sol-gel, and printing firing processes. Especially when preparing a structure wherein a thick film with a built-in electrode is formed on the substrate, it is preferable to make use of the same process as in the dielectric thick film.

The electrode layer should have a resistivity of preferably 1 Ω·cm or less and especially 0.003 to 0.1 Ω·cm for efficient application of an electric field to the light-emitting layer. The electrode layer should have a thickness of preferably 50 to 2,000 nm and especially of the order of 100 to 1,000 nm although varying with the material used.

While the application of the light emitting layer of the present invention to an inorganic EL device has been described, it is understood that the fluorescent thin film of the invention may also be applied to a full-color display panel using other forms of devices capable of emitting red, blue and green light.

EXAMPLES

The present invention is now explained more specifically with reference to examples.

Example 1

One example of the evaporation system which may be used for the fabrication process of the present invention is shown in FIG. 1. Here two electron guns were used instead of the K-cell.

An EB source 15 having $Al_2S_3$ powders charged therein with 5 mol % of Eu added thereto and an EB source 14 having metal La charged therein were placed in a vacuum chamber 11. The $Al_2S_3$ powders and metal La were simultaneously evaporated from the respective sources, and heated to 400° C. to form a film form of $LaAl_2S_4$:Eu layer on a rotating substrate. The rate of evaporation from each evaporation source was controlled in such a way that the rate of deposition of $LaAl_2S_4$ was 1 nm/sec., and the molar ratio of La:$Al_2S_3$ was 1:1. In this example, $H_2S$ gas was introduced at 20 SCCM into the evaporation system. The thus obtained thin film was then annealed at 900° C. in vacuum for 10 minutes.

By fluorescent X-ray composition analysis, the $LaAl_2S_4$:Eu thin film was found to comprise, in atomic ratio, La:Al:S:Eu=12.3:25.1:50.0:0.65.

Using this light-emitting layer, an EL device was fabricated. By applying a 1 kHz electric field having a pulse width of 50 μs to the electrodes, a blue emission luminance of 300 cd/$M^2$ could be obtained with high reproducibility.

Example 2

Example 1 was repeated with the exception that Nd was used instead of the rare earth metal La and $Ga_2S_3$ was used in place of $Al_2S_3$. Substantially similar results were obtained. In this example, green light was emitted.

Example 3

Example 1 was repeated with the exception that Y was used instead of the rare earth metal La and $In_2S_3$ was used in place of $Al_2S_3$. Substantially similar results were obtained. In this example, red light was emitted.

Example 4

Example 1 was repeated with the exception that Eu was used instead of the rare earth metal La and Ce was used in place of Eu. Substantially similar results were obtained. In this example, blue light was emitted.

With the fluorescent thin film of the present invention, it is thus possible to achieve red, green and blue fluorescent thin-film materials which can emit light at higher luminance yet with satisfactory color purity, and achieve high luminance using the same film-forming method or system.

By using a fluorescent matrix material and a light emission center material that are chemically or physically similar in properties to each other according to the present invention, it is possible to simplify a full-color EL panel production process, thereby providing a fluorescent thin film which is less susceptible to luminance variations and can be produced in improved yields and so at lower costs.

The fabrication process of the present invention enables composition control to be effected with improved reproducibility, and provides a solution to sulfur-deficiency and contamination-with-impurities problems in conjunction with the sulfide defining the matrix material of the fluorescent thin film, so that a light emitting layer of improved luminance can be obtained.

EL devices using such a thin film are improved in terms of light emission capabilities and practical utility, because especially when multi-color EL devices or full-color EL devices are fabricated, light emission layers can be fabricated with improved reproducibility.

Advantages of the Invention

According to the present invention, it is thus possible to provide a fluorescent thin film which can dispense with any filter and has satisfactory color purity, and is particularly well fit for RGB full-color ELs and its fabrication process as well as an EL panel.

It is also possible to simplify a full-color EL panel production process, thereby providing a fluorescent thin film which is less susceptible to luminance variations and can be produced in improved yields and so at lower costs and its fabrication process as well as an EL panel.

Japanese Patent Application No. 115666/2000 is herein incorporated by reference.

What is claimed is:

1. A fluorescent thin film comprising a matrix material which comprises a rare earth sulfide or a rare earth selenide, and which further comprises a rare earth element as a light emission center, the rare earth element as the light emission center being different from the rare earth element of the matrix material, and wherein said rare earth sulfide comprises at least one compound selected from the group consisting of lanthanum thioaluminate and neodymium thioaluminate.

2. The fluorescent thin film according to claim 1, wherein said rare earth element added as said light emission center is one element selected from the group consisting of at least Ce, Eu, Tb and Tm.

3. An EL panel comprising a fluorescent thin film as recited in claim 1.

4. A process of forming the fluorescent thin film according to claim 1 by an evaporation technique, wherein:

at least, a rare earth metal evaporation source and a group III sulfide evaporation source with a light emission center added thereto are placed in a vacuum chamber with $H_2S$ gas introduced therein, and a rare earth metal and a group III sulfide material are evaporated from the respective evaporation sources to deposit a sulfide fluorescent thin film on a substrate while the respective materials are combined with the $H_2S$ gas.

5. A fluorescent thin film comprising a matrix material which comprises a rare earth sulfide or a rare earth selenide, and which further comprises a rare earth element as a light emission center, the rare earth element as the light emission center being different from the rare earth element of the matrix material, and wherein said rare earth sulfide comprises at least one compound selected from the group consisting of lanthanum thioaluminate, neodymium thiogallate and yttrium thioindate.

6. The fluorescent thin film according to claim 5, wherein said rare earth element added as said light emission center is one element selected from the group consisting of at least Ce, Eu, Tb and Tm.

7. An EL panel comprising a fluorescent thin film as recited in claim 5.

8. A process of forming the fluorescent thin film according to claim 5 by an evaporation technique, wherein:

at least, a rare earth metal evaporation source and a group III sulfide evaporation source with a light emission center added thereto are placed in a vacuum chamber with $H_2S$ gas introduced therein, and a rare earth metal and a group III sulfide material are evaporated from the respective evaporation sources to deposit a sulfide fluorescent thin film on a substrate while the respective materials are combined with the $H_2S$ gas.

9. A fluorescent thin film for an EL panel comprising a matrix material which is lanthanum thioaluminate or neodymium thioaluminate, and which further comprises a rare earth element as a light emission center, the rare earth element as the light transmission center being different from the rare earth element of the matrix material, wherein said rare earth element of the matrix material is an element selected from the group consisting of Y, La, Ce, Pr, Nd, Gd, Tb, Ho, and Er.

10. An EL panel comprising a fluorescent thin film comprising a matrix material which comprises a rare earth sulfide or a rare earth selenide, and which further comprises a rare earth element as a light emission center, the rare earth element as the light transmission center being different from the rare earth element of the matrix material, wherein said rare earth sulfide comprises at least one compound selected from the group consisting of a rare earth thioaluminate, a rare earth thiogallate and a rare earth thioindate, and wherein said rare earth element of the matrix material is an element selected from the group consisting of Y, La, Ce, Pr, Nd, Gd, Tb, Ho, and Er.

11. A fluorescent thin film for an EL panel comprising a matrix material which is at least one compound selected from the group consisting of lanthanum thioaluminate, neodymium thiogallate and yttrium thioindate, and which further comprises a rare earth element as a light emission center, the rare earth element as the light transmission center being different from the rare earth element of the matrix material, wherein said rare earth element of the matrix material is an element selected from the group consisting of Y, La, Ce, Pr, Nd, Gd, Tb, Ho, and Er.

* * * * *